(12) United States Patent
Yang et al.

(10) Patent No.: US 8,024,139 B2
(45) Date of Patent: Sep. 20, 2011

(54) METHOD AND COMPUTER CODE FOR STATISTICAL PROCESS CONTROL FOR CENSORED PRODUCTION DATA

(75) Inventors: Siyuan Frank Yang, Shanghai (CN); Wei-Ting Kary Chien, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 469 days.

(21) Appl. No.: 12/130,716

(22) Filed: May 30, 2008

(65) Prior Publication Data

US 2009/0216470 A1  Aug. 27, 2009

(30) Foreign Application Priority Data

Feb. 25, 2008  (CN) .......................... 2008 1 0034008

(51) Int. Cl.
*G06F 19/00* (2011.01)
(52) U.S. Cl. .......... 702/64; 438/149; 438/166; 438/455; 257/487; 257/347; 117/13; 324/762.1; 324/762.05; 706/21; 706/62
(58) Field of Classification Search .................... 702/64; 438/49, 166, 455; 257/51, 487, 347, 352, 257/E21.567; 117/13; 324/754.22, 762.1, 324/762.05, 750.03; 706/21, 62; 714/724, 714/819, 25
See application file for complete search history.

(56) References Cited

U.S. PATENT DOCUMENTS

| | | | | |
|---|---|---|---|---|
| 5,519,333 A * | 5/1996 | Righter | .................... | 324/762.02 |
| 5,548,211 A * | 8/1996 | Tujide et al. | ............. | 324/754.22 |
| 6,091,249 A * | 7/2000 | Talbot et al. | ............. | 324/754.22 |
| 6,714,032 B1 * | 3/2004 | Reynick | .................... | 324/762.02 |
| 6,848,049 B1 * | 1/2005 | Tailliet | .......... | 713/168 |
| 6,873,171 B2 * | 3/2005 | Reynick | .................... | 324/762.01 |
| 7,701,240 B2 * | 4/2010 | Flautner et al. | ............. | 324/750.3 |
| 7,702,598 B2 * | 4/2010 | Saidi et al. | ........... | 706/21 |
| 2004/0160239 A1 * | 8/2004 | Reynick | .......... | 324/765 |
| 2006/0200699 A1 * | 9/2006 | Flautner et al. | ................. | 714/25 |
| 2007/0145270 A1 * | 6/2007 | Miyamoto et al. | ............ | 250/310 |
| 2009/0115468 A1 * | 5/2009 | Berthold et al. | .............. | 327/141 |

FOREIGN PATENT DOCUMENTS

CN  1314702 A  9/2001

* cited by examiner

*Primary Examiner* — Carol S Tsai
(74) *Attorney, Agent, or Firm* — Kilpatrick Townsend and Stockton LLP

(57) ABSTRACT

A method for monitoring device characteristics of semiconductor integrated circuits. The device characteristics includes censored data and uncensored data. The method includes determining a plurality of minimum breakdown voltages numbered from 1 through N, respectively, for a plurality of lots (e.g., wafer fabrication lots) numbered from 1 through N. Each of the plurality of minimum breakdown voltages is respectively indicative of the plurality of samples through order statistics. One or more of the plurality of samples includes one or more uncensored data points and one or more censored data points. The method includes processing the minimum breakdown voltages, respectively, for the plurality of lots. Each of the minimum breakdown voltages is processed for the respective plurality of lots and is indicative of a population characteristic breakdown voltage numbered from 1 through N for the respective lot numbered from 1 through N. The method includes determining one or more anomalies based upon the processing of the minimum breakdown voltages. The one or more anomalies is associated with one or more processes associated with at least one of the lots.

16 Claims, 7 Drawing Sheets

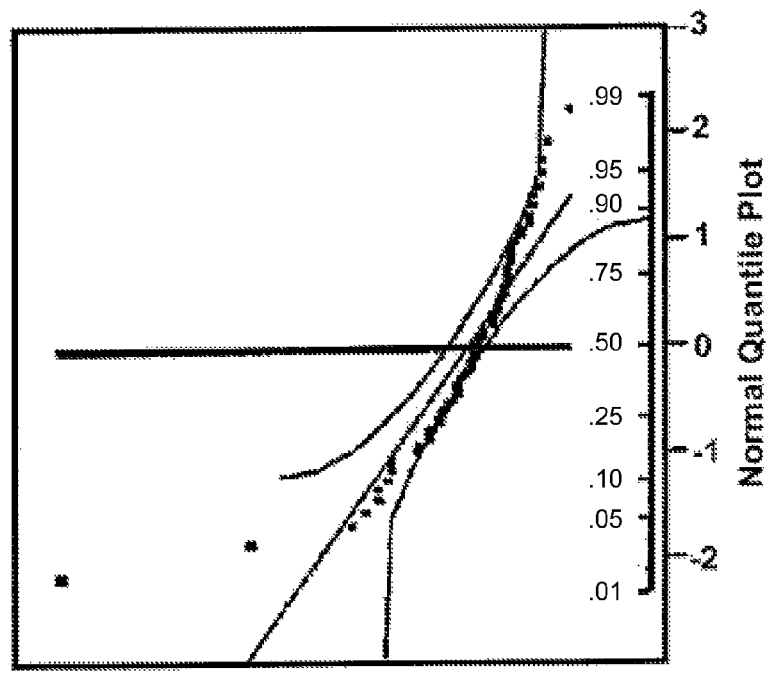
FIGURE 3. Normal Quantile Plot for Original VBD data
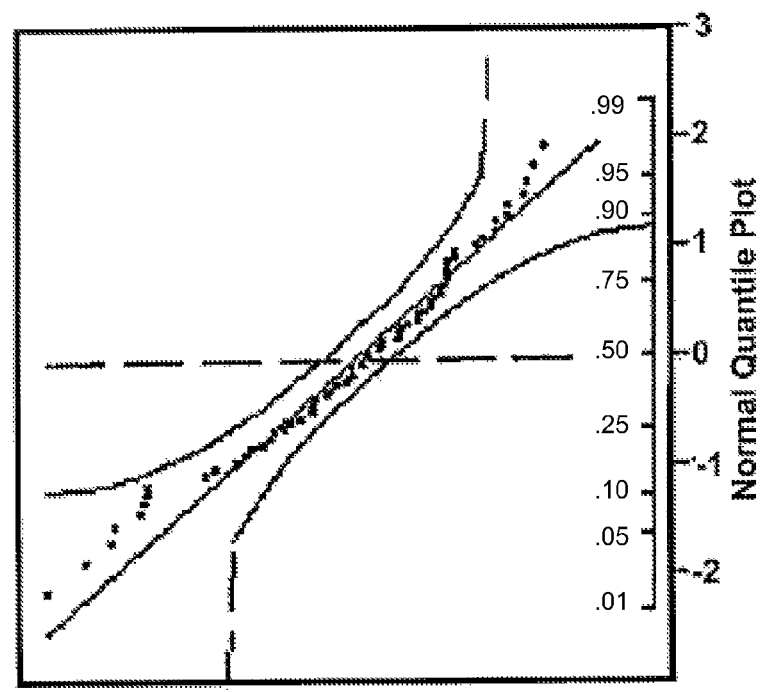
FIGURE 4

FIGURE 5. Normal quantile plot and histogram of the data after outlier removing and Box-Cox transformation FIGURE 6. Control chart with calculated control limit

METHOD AND COMPUTER CODE FOR STATISTICAL PROCESS CONTROL FOR CENSORED PRODUCTION DATA

CROSS-REFERENCE TO RELATED APPLICATIONS

This application claims priority to Chinese Application No. 200810034008.4, filed on Feb. 25, 2008, commonly assigned, and of which is hereby incorporated by reference for all purposes.

COPYRIGHT NOTICE

Certain portions of the present specification include computer codes, where notice is hereby given. All rights have been reserved under Copyright for such computer codes, by © 2004 and 2005 Semiconductor Manufacturing International (Shanghai) Corporation, which is the present assignee.

BACKGROUND OF THE INVENTION

The present invention is directed to integrated circuits and their processing for the manufacture of semiconductor devices. In particular, the invention provides a method and system for monitoring and controlling process related information for the manufacture of semiconductor integrated circuit devices. More particularly, the invention provides a method and system for monitoring device characteristics, including censored data and uncensored data, of semiconductor integrated circuits in the manufacture of semiconductor integrated circuit devices. But it would be recognized that the invention has a much broader range of applicability.

Integrated circuits have evolved from a handful of interconnected devices fabricated on a single chip of silicon to millions of devices. Conventional integrated circuits provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of integrated circuits.

Increasing circuit density has not only improved the complexity and performance of integrated circuits but has also provided lower cost parts to the consumer. An integrated circuit or chip fabrication facility can cost hundreds of millions, or even billions, of U.S. dollars. Each fabrication facility will have a certain throughput of wafers, and each wafer will have a certain number of integrated circuits on it. Therefore, by making the individual devices of an integrated circuit smaller, more devices may be fabricated on each wafer, thus increasing the output of the fabrication facility. Making devices smaller is very challenging, as each process used in integrated fabrication has a limit. That is to say, a given process typically only works down to a certain feature size, and then either the process or the device layout needs to be changed. Additionally, as devices require faster and faster designs, process limitations exist with certain conventional processes, including monitoring techniques, materials, and even testing techniques.

An example of such processes includes ways of monitoring process related functions during the manufacture of integrated circuits, commonly called semiconductor devices. Such monitoring process is often desired for continuously improving quality and productivity to stay competitive. As merely an example, statistical process control (SPC) has been playing an important role in conventional industries. It is a procedure in which data are collected, organized, analyzed and interpreted. Actions are requested to identify root causes and to implement solutions so a process can be maintained at its desired level or be improved to a higher level. SPC makes use of statistical signals to identify sources of variation, to correct identified variation causes therefore to improve performance, and to maintain control of processes.

Conventional SPC control limits determination often assumes a normal distribution and no censored data is provided in the data collection. In many cases in reliability data collection data censoring occurs frequently. For example, the voltage breakdown (VBD) data of inter-layer dielectric "ILD" measured with ramped up voltage could be censored when some of dice of the sample do not have breakdown failure at a maximum ramped up voltage. In these cases, a direct application of an X-Bar and S control chart on the observed data is often not adequate. Accordingly, data collection is not reliable.

From the above, it is seen that an improved technique for manufacturing semiconductor devices is desired.

BRIEF SUMMARY OF THE INVENTION

According to the present invention, techniques directed to integrated circuits and their processing for the manufacture of semiconductor devices are provided. In particular, the invention provides a method and system for monitoring and controlling process related information for the manufacture of semiconductor integrated circuit devices. More particularly, the invention provides a method and system for monitoring device characteristics, including censored data and uncensored data, of semiconductor integrated circuits in the manufacture of semiconductor integrated circuit devices. But it would be recognized that the invention has a much broader range of applicability.

In a specific embodiment, the present invention provides a method for monitoring device characteristics of semiconductor integrated circuits. The device characteristics includes censored data and uncensored data. The method includes determining a plurality of minimum breakdown voltages numbered from 1 through N, respectively, for a plurality of lots (e.g., wafer fabrication lots) numbered from 1 through N. Each of the plurality of minimum breakdown voltages is respectively indicative of the plurality of samples through order statistics. In a preferred embodiment, the lot corresponds to a plurality of semiconductor wafers being processed through one or more processes for the manufacture of integrated circuits or other devices. One or more of the plurality of samples includes one or more uncensored data points and one or more censored data points. The method includes processing the minimum breakdown voltages, respectively, for the plurality of lots. Each of the minimum breakdown voltages is processed for the respective plurality of lots and is indicative of a population characteristic breakdown voltage numbered from 1 through N for the respective lot numbered from 1 through N. The method includes determining one or more anomalies based upon the processing of the minimum breakdown voltages. The one or more anomalies is associated with one or more processes associated with at least one of the lots. The method provides an output based upon the one or more anomaly.

Many benefits are achieved by way of the present invention over conventional techniques. For example, the present technique provides an easy to use process that relies upon conventional technology. In some embodiments, the method provides higher device reliability and performance. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 3 is a simplified plot of breakdown voltage according to an embodiment of the present invention;

FIG. 4 is a simplified plot of transformed data for breakdown voltage according to an embodiment of the present invention;

DETAILED DESCRIPTION OF THE INVENTION

Figure 1:
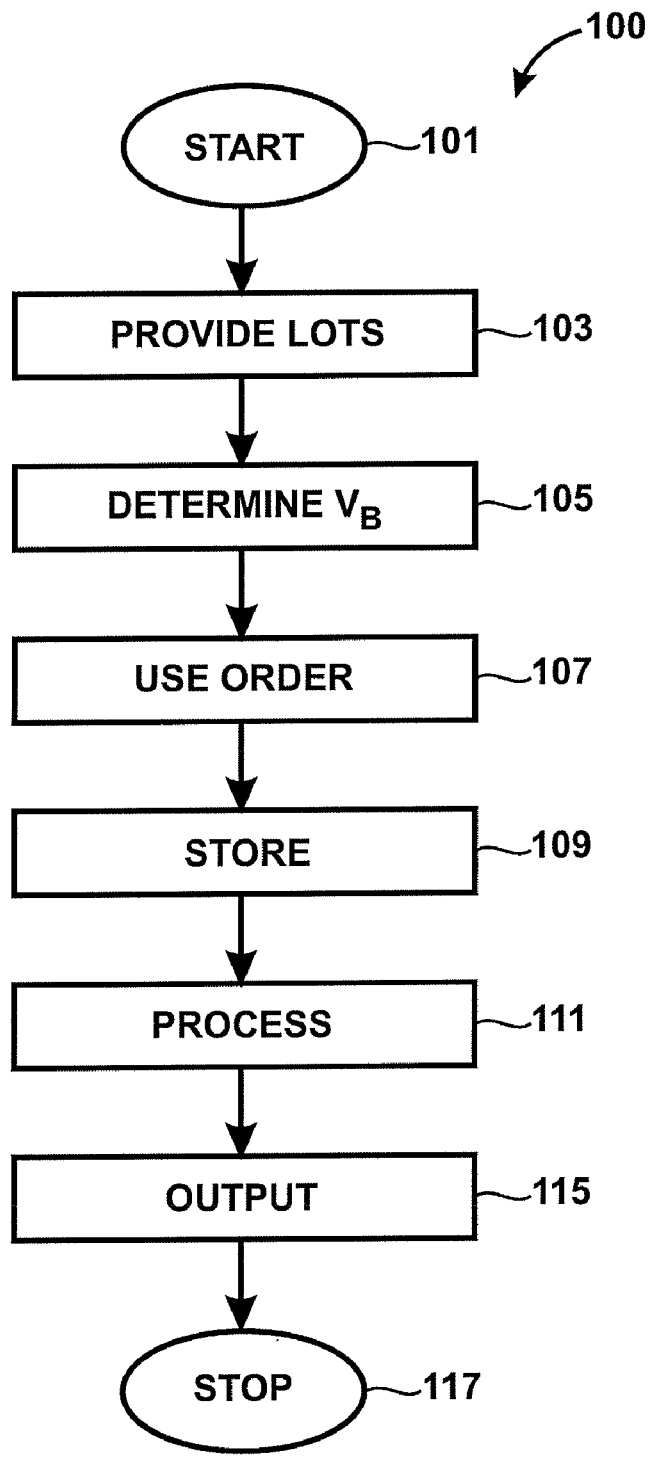
FIG. 1 is a simplified flow chart illustrating a method according to an embodiment of the present invention.

According to the present invention, techniques directed to integrated circuits and their processing for the manufacture of semiconductor devices are provided. In particular, the invention provides a method and system for monitoring and controlling process related information for the manufacture of semiconductor integrated circuit devices. More particularly, the invention provides a method and system for monitoring device characteristics, including censored data and uncensored data, of semiconductor integrated circuits in the manufacture of semiconductor integrated circuit devices. But it would be recognized that the invention has a much broader range of applicability.

In a specific embodiment, the present invention provides a method for monitoring device characteristics of semiconductor integrated circuits as follows: see FIG. 1.

1. Provide a plurality of lots (each of the lots having a plurality of semiconductor wafers being processed, e.g., complete functional integrated circuits or partial devices but functional elements) numbered from 1 through N;

2. Determine a plurality of minimum breakdown voltages numbered from 1 through N, respectively, for a plurality of lots numbered from 1 through N;

3. Using order statistics to associate the plurality of minimum breakdown voltages to a plurality of samples (e.g., wafers);

4. Store information from at least one or more of the plurality of samples including one or more uncensored data points and one or more censored data points;

5. Process the minimum breakdown voltages, respectively, for the plurality of lots (each of the minimum breakdown voltages processed for the respective plurality of lots is indicative of a population characteristic breakdown voltage numbered from 1 through N for the respective lot numbered from 1 through N);

6. Determine one or more anomalies based upon the processing of the minimum breakdown voltages (the one or more anomalies is associated with one or more processes associated with at least one of the lots;

7. Provide an output based upon the one or more anomaly;

8. Perform other steps, as desired; and

9. Stop.

The above sequence of steps provides methods according to an embodiment of the present invention. As shown, the method uses a combination of steps including a way of performing a SPC process according to an embodiment of the present invention. Many other methods and system are also included. Of course, other alternatives can also be provided where steps are added, one or more steps are removed or repeated, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives. Further details of the present method and system can be found through out the present specification and more particularly below.

Figure 2:
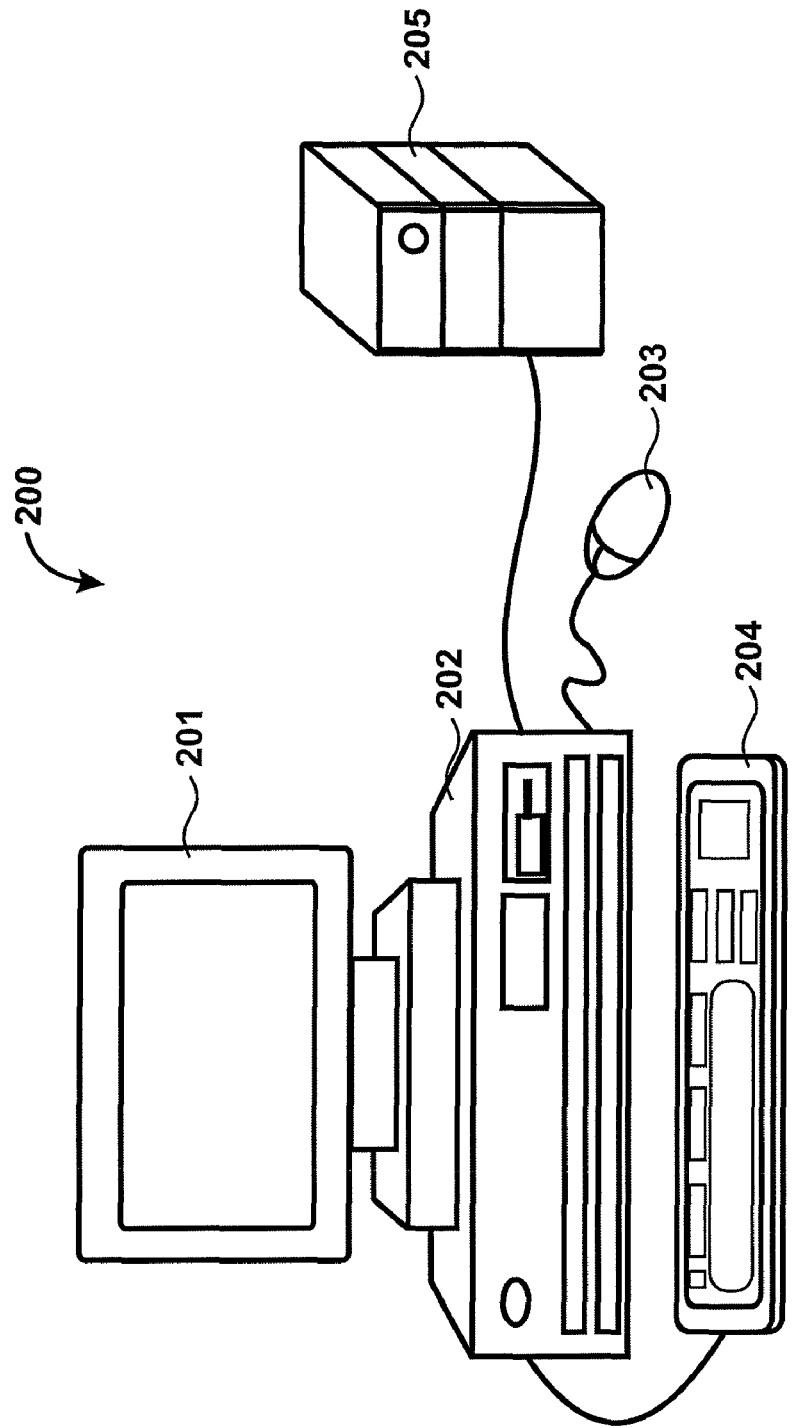
FIG. 2 is a simplified diagram illustrating a general purpose computer that is capable of performing the method illustrated in FIG. 1 according to an embodiment of the present invention.

FIG. 1 is a simplified flowchart 100 illustrating a method according to an embodiment of the present invention. This diagram is merely an example, which should not unduly limit the scope of the claims herein. One of ordinary skill in the art would recognize other variations, modifications, and alternatives. FIG. 2 is a simplified diagram illustrating a general purpose computer that is capable of performing the method illustrated by the flowchart 100 according to an embodiment of the present invention. This diagram is merely an example, which should not unduly limit the scope of the claims herein. One of ordinary skill in the art would recognize other variations, modifications, and alternatives. As shown, the present method begins at start, step 101. In a specific embodiment, the present invention provides a method for monitoring device characteristics of semiconductor integrated circuits.

As shown, the method begins by providing (step 103) a plurality of lots (each of the lots having a plurality of semiconductor wafers being processed, e.g., complete functional integrated circuits or partial devices but functional elements) numbered from 1 through N. In a specific embodiment, each of the lots includes one or more structures that are capable of being characterized by a breakdown voltage associated with an integrated circuit. In a specific embodiment, the integrated circuit can include a memory device, application specific integrated circuit, commonly called ASICS, or microprocessor-type (e.g., microprocessor, digital signal processor, or microcontroller device). Of course, there can be other variations, modifications, and alternatives.

In a specific embodiment, the method includes determining (step 105) a plurality of minimum breakdown voltages numbered from 1 through N, respectively, for a plurality of lots numbered from 1 through N. In a specific embodiment, the breakdown voltages are measured using a conventional testing technique. Depending upon application, breakdown voltages may be generated in various ways. Of course, there can be other variations, modifications, and alternatives.

Referring back to FIG. 1, the present method includes using (step 107) order statistics to associate the plurality of minimum breakdown voltages to a plurality of samples (e.g., wafers). The method includes storing information (step 109) from at least one or more of the plurality of samples including one or more uncensored data points and one or more censored data points. As an example, FIG. 2 illustrates a way of associating the breakdown voltages to the samples using order statistics. Of course, there can be other variations, modifications, and alternatives.

In a specific embodiment, the method includes processing (step 111) the minimum breakdown voltages, respectively, for the plurality of lots (each of the minimum breakdown voltages processed for the respective plurality of lots is indicative of a population characteristic breakdown voltage numbered from 1 through N for the respective lot numbered from 1 through N). Depending on applications, the breakdown voltage may be measured in various ways. Of course, there can be other variations, modifications, and alternatives.

Referring back to FIG. 1, the method includes determining one or more anomalies based upon the processing of the minimum breakdown voltages in a specific embodiment. In a specific embodiment, the one or more anomalies is associated with one or more processes associated with at least one of the lots. In a specific embodiment, the one or more processes can include implantation, deposition, photo masking, etching, diffusion, any combination of these, and the like. Of course, there can be other variations, modifications, and alternatives.

In a specific embodiment, the method includes providing an output (step 115) based upon the one or more anomaly. In a specific embodiment, the method includes outputting using a plot (e.g., in graphical form), a print out, or other output suitable for use with the present method and system. In a specific embodiment, the method ends at step 117, which is stop. Of course, there can be other variations, modifications, and alternatives.

The above sequence of steps provides methods according to an embodiment of the present invention. As shown, the method uses a combination of steps including a way of performing a SPC process according to an embodiment of the present invention. Many other methods and system are also included. Of course, other alternatives can also be provided where steps are added, one or more steps are removed or repeated, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives.

Example: To prove the principle and operation of the present method and system, we performed various experiments. These experiments are merely examples, which should not unduly limit the scope of the claims herein. One of ordinary skill in the art would recognize many variations, modifications, and alternatives. As background information, we understand that conventional SPC control limits determination assumes normal distribution and no censored data happened in the data collection. In many cases in reliability data collection data censoring happens frequently. For example, the VBD data of iLD measured with ramped up voltage could be censored when some of dice of the sample do not have breakdown failure at a maximum ramped up voltage. In these case, a direct application of an $\overline{X}$ and S control chart on the observed data is not adequate anymore.

There exist a method called "CEV" control limit calculation in literature (published by Stefan H. Steiner etc, in J. of Quality Technology, Vo. 32, No. 3, pp. 199-208, 2000) for censored observations. They use X ban and Sigma control charts but modify the control limits calculated with correction from CEV weights for a fixed level of censoring. However, it assumes distribution parameters are known or they have to be estimated accurately from the complete type data (i.e. from uncensored data). This requirement is not met in many practical applications. Therefore a practical alternative method is needed.

In statistical process control of reliability, many testing items are one side comparison, i.e. higher or lower measured results are desirable. For example, in the iLD VBD reliability testing, the higher the VBD values, the better of the processes which influence this reliability testing. Therefore, monitoring its minimum VBD value from a test of certain sample size n shall constitute a good control chart candidate. If its minimum VBD is in control, then the process is in control too. For order statistics, the minimum value from a test on sample size n has its own distribution different from the original (parent) distribution of the n samples ($X(1), X(2), \ldots X(i), \ldots X(n)$, if they are not censored at all). If the parent distribution has its pdf and cdf as $fx(x)$ and $Fx(x)$, then the pdf of the minimum $X(1)$ has the following distribution.

$$f_{X(1)} = n[1 - F_x(x)]^{n-1} f_x(x)$$

(Nancy R. Mann, etc, "Methods for Statistical Analysis of Reliability and Life Data, p. 91, 1974.)

The distribution of minimum will be off from normal distribution even if the parent distribution was normal distribution. Therefore, we need to transform the minimum's distribution to normal or close to normal distribution before we use traditional method for control limit calculation. Since the minimum value is an individual point, the traditional method of control limit calculation after transformation uses the following formula:

Where MR is the moving range of successive observations.

$$LCL = \overline{X} - 3[\overline{MR}/1.28]$$

The following example demonstrates how the minimum values are used for control limit calculation.

A reliability test of VBD (voltage of break down) is needed to monitor its performance weekly. The sample size of a test is 26. The maximum ramped up voltage for break down test is limited to 100 volts due to concern of potential probe card burning on testing tools. The collected data show different percentage of censored observations. Some of test results of one test have all censored observation, i.e. none of the 26 dice failed during testing with 100V cut off scanned voltage.

First of all, outliers are screened out with Grubbs' method. We then use Box-Cox transformation technique to transfer the non-normal data into normal or close to normal distribution. Then apply a traditional method of control limit calculation for individual measurement to calculate the control limits.

The FIG. 3 shows the normal quantile plot from the original VBD data without outlier screening and Box-Cox transformation. This diagram is merely an example, which should not unduly limit the scope of the claims herein. One of ordinary skill in the art would recognize many variations, modifications, and alternatives. You can see it is very much off from normal distribution. FIG. 4 is the normal quantile plot for breakdown voltage after outlier screening and transformation according to an embodiment of the present invention. This diagram is merely an example, which should not unduly limit the scope of the claims herein. One of ordinary skill in the art would recognize many variations, modifications, and alternatives.

Figure 5:
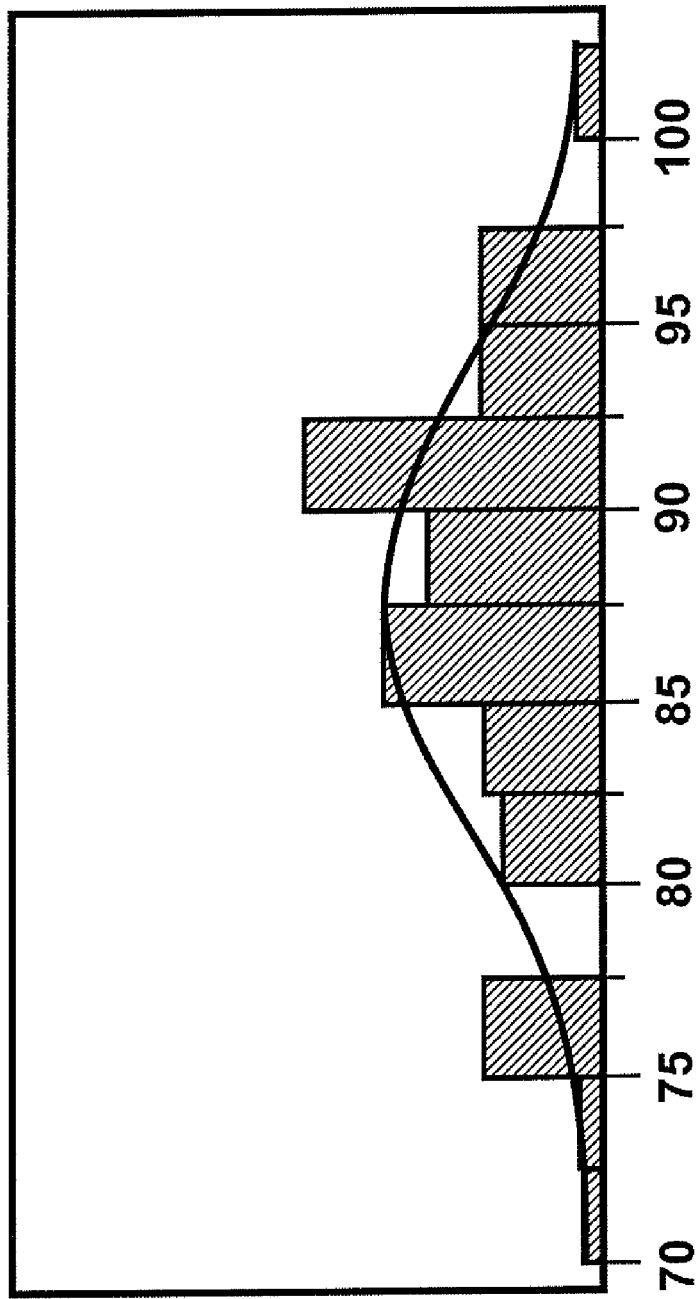
FIG. 5 is a histogram plot of transformed data according to an embodiment of the present invention.

After two outliers are removed and Box-Cox transformed, its normal quantile plot in FIG. 4 shows that the data are around the straight ling which indicates normal distribution. FIG. 5 shows the histogram after outlier removing and transformation. This diagram is merely an example, which should not unduly limit the scope of the claims herein. One of ordinary skill in the art would recognize many variations, modifications, and alternatives.

The optimized Box-Cox transformation is $Y=(X^2-1)/174.95$ where X is the observation before transformation and Y is after transformation.

Figure 6:
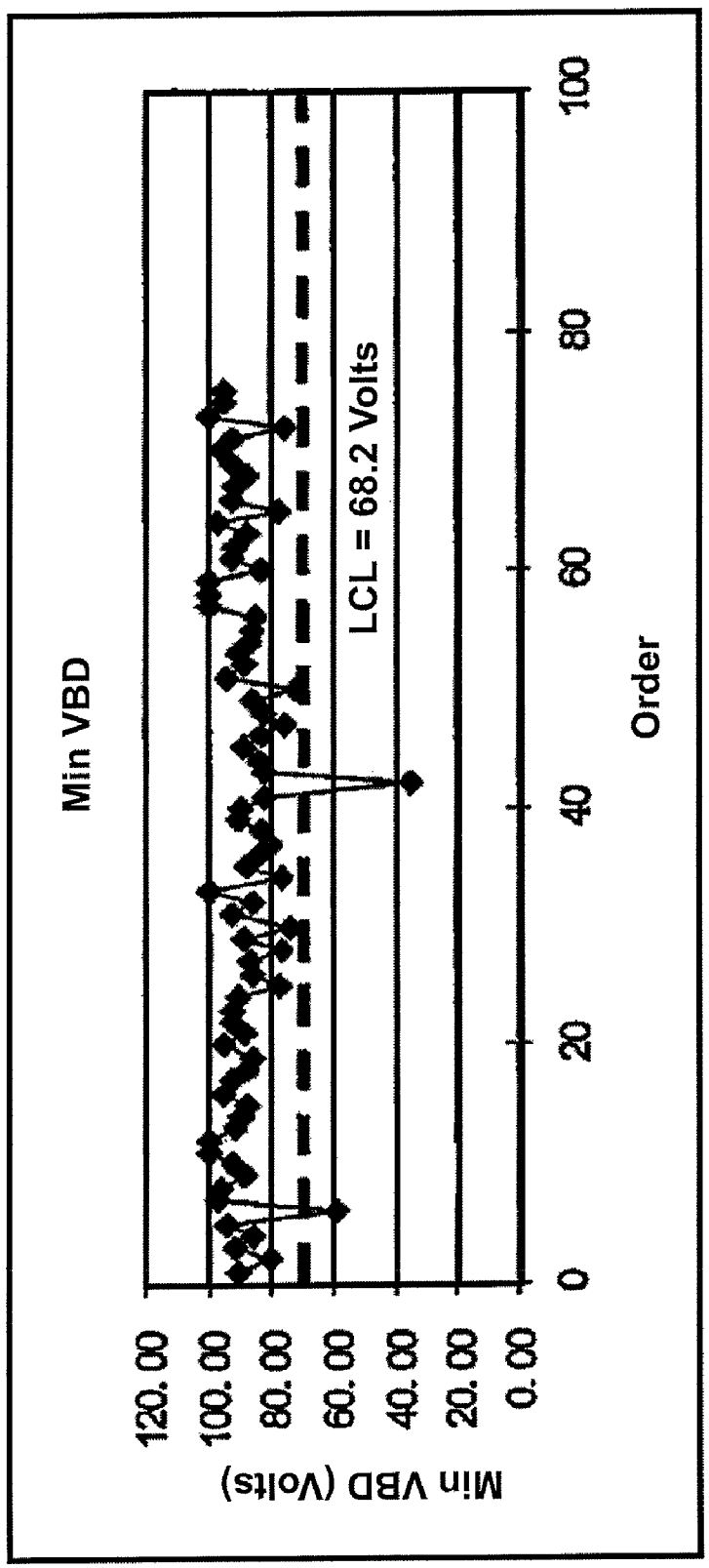
FIG. 6 is a control chart according to an embodiment of the present invention.

For the control chart with one side Specification, only one side control limit is needed. The low control limit (LCL) with the transformed data was obtained using the above formulae. The calculated Avg X is 44.176 and Avg MR is 7.506 with Box-Cox transformed data. The LCL for transformed data is 26.59 and therefore the LCL for original VBD control chart is 68.2 volts, calculated with the Box-Cox transformation formulae. Therefore the control chart with calculated control limit is shown in FIG. 6. This diagram is merely an example, which should not unduly limit the scope of the claims herein. One of ordinary skill in the art would recognize many variations, modifications, and alternatives.

The data shown in control chart include the censored data points. However the control limit calculation is based on only the minimum data other than 100 volts. We divide the samples into two groups. These tests with one or more VBD data points less than 100 Volts are considered as the first group and the other tests with all 100 Volts are considered as second group. We only monitor the first group in control chart.

Conclusion: Appropriate transformation to normality with Minimum statistic makes it feasible to calculate control limits for censored monitor data. Of course, there can be variations, modifications, and alternatives.

Depending upon the specific embodiment, the system is overseen and controlled by one or more computer systems, including a microprocessor and/controllers. In a preferred embodiment, the computer system or systems include a common bus, oversees and performs operation and processing of information. The system also has a display, which can be a computer display, coupled to the control system, which will be described in more detail below. Of course, there can be other modifications, alternatives, and variations. Further details of the present system are provided throughout the specification and more particularly below.

Figure 7:
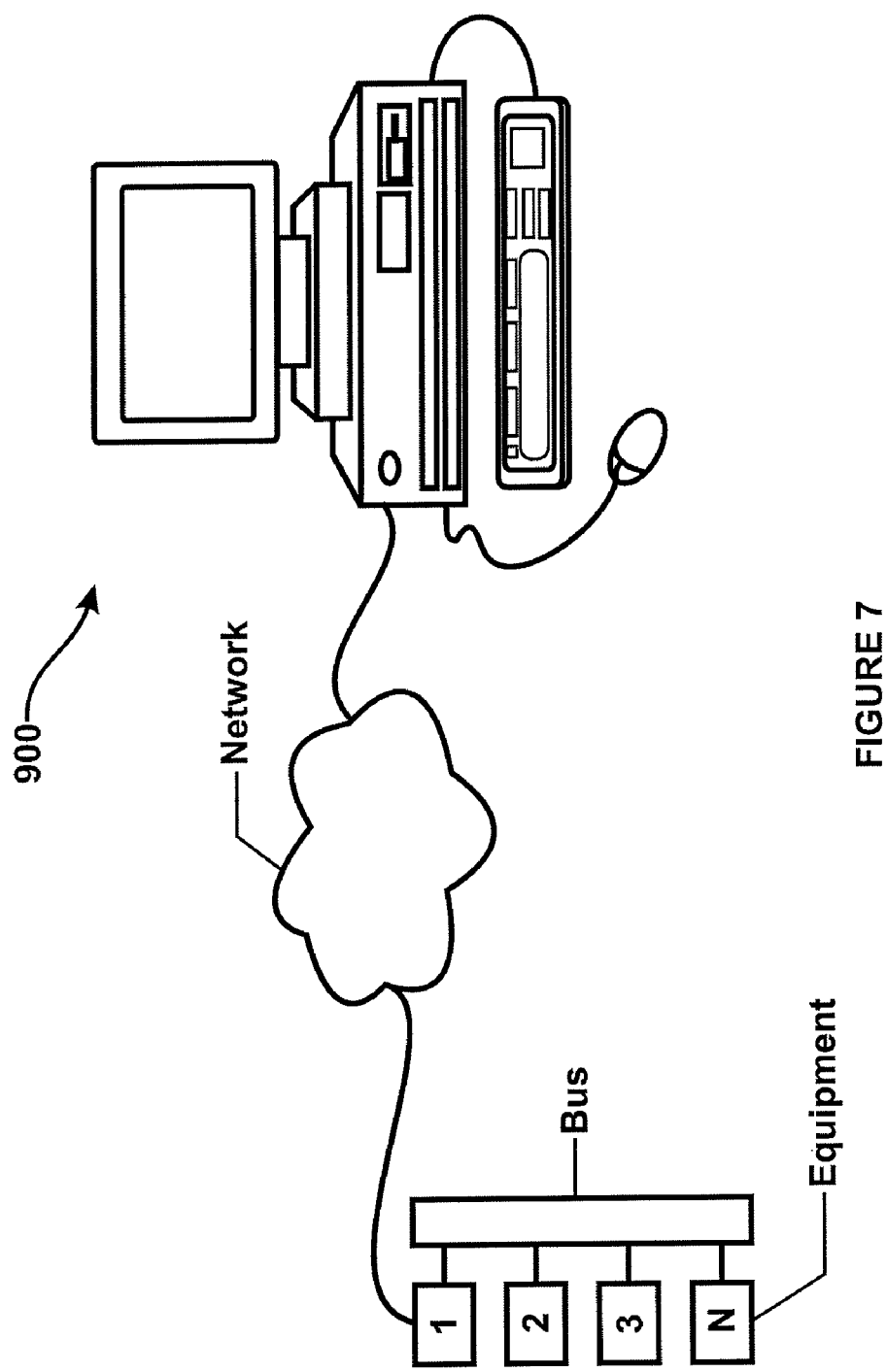
FIG. 7 is a simplified computer system according to an embodiment of the present invention.

FIG. 7 is a simplified diagram of a computer system 900 that is used to oversee the method of FIG. 1 according to an embodiment of the present invention. This diagram is merely an example, which should not unduly limit the scope of the claims herein. One of ordinary skill in the art would recognize many other modifications, alternatives, and variations. As shown, the computer system includes display device, display screen, cabinet, keyboard, scanner and mouse. Mouse and keyboard are representative "user input devices." Mouse includes buttons for selection of buttons on a graphical user interface device. Other examples of user input devices are a touch screen, light pen, track ball, data glove, microphone, and so forth.

The system is merely representative of but one type of system for embodying the present invention. It will be readily apparent to one of ordinary skill in the art that many system types and configurations are suitable for use in conjunction with the present invention. In a preferred embodiment, computer system 900 includes a Pentium™ class based computer, running Windows™ NT operating system by Microsoft Corporation or Linux based systems from a variety of sources. However, the system is easily adapted to other operating systems and architectures by those of ordinary skill in the art without departing from the scope of the present invention. As noted, mouse can have one or more buttons such as buttons. Cabinet houses familiar computer components such as disk drives, a processor, storage device, etc. Storage devices include, but are not limited to, disk drives, magnetic tape, solid-state memory, flash memory, bubble memory, etc. Cabinet can include additional hardware such as input/output (I/O) interface cards for connecting computer system to external devices external storage, other computers or additional peripherals, which are further described below.

Figure 8:
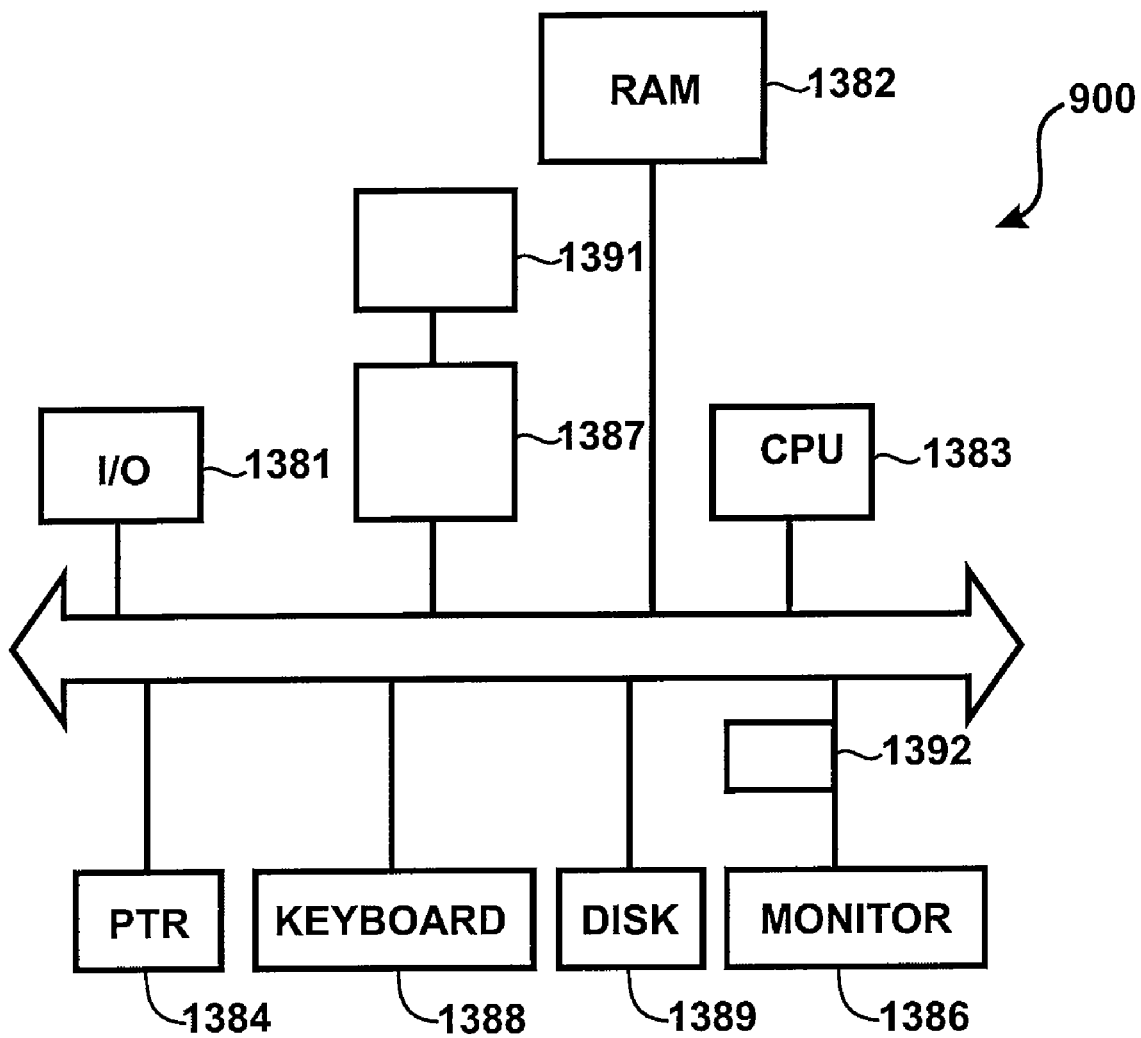
FIG. 8 is a simplified block diagram of a computer system according to an embodiment of the present invention.

FIG. 8 is a more detailed diagram of hardware elements in the computer system according to an embodiment of the present invention. This diagram is merely an example, which should not unduly limit the scope of the claims herein. One of ordinary skill in the art would recognize many other modifications, alternatives, and variations. As shown, basic subsystems are included in computer system 900. In specific embodiments, the subsystems are interconnected via a system bus 1385. Additional subsystems such as a printer 1384, keyboard 1388, fixed disk 1389, monitor 1386, which is coupled to display adapter 1392, and others are shown. Peripherals and input/output (I/O) devices, which couple to I/O controller 1381, can be connected to the computer system by any number of means known in the art, such as serial port 1387. For example, serial port 1387 can be used to connect the computer system to a modem 1391, which in turn connects to a wide area network such as the Internet, a mouse input device, or a scanner. The interconnection via system bus allows central processor 1383 to communicate with each subsystem and to control the execution of instructions from system memory 1382 or the fixed disk 1389, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Although the above has been illustrated in terms of specific hardware features, it would be recognized that many variations, alternatives, and modifications can exist. For example, any of the hardware features can be further combined, or even separated. The features can also be implemented, in part, through software or a combination of hardware and software. The hardware and software can be further integrated or less integrated depending upon the application. Further details of certain methods according to the present invention can be found throughout the present specification and more particularly below.

The disclosures and the description herein are purely illustrative and are not to be limited with the above examples. A person skilled in reliability engineering and reliability statistics would be able to apply the method disclosed in the above embodiments to his/her particular product, component or system in reliability testing. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for monitoring device characteristics of semiconductor integrated circuits, the device characteristics including censored data and uncensored data, the method comprising:

determining a plurality of minimum breakdown voltages numbered from 1 through N, respectively, for a plurality of lots numbered from 1 through N, each of the plurality of minimum breakdown voltages being respectively indicative of the plurality of samples through order statistics, one or more of the plurality of samples including one or more uncensored data points and one or more censored data points;

processing the minimum breakdown voltages, respectively, for the plurality of lots, each of the minimum breakdown voltages processed for the respective plurality of lots being indicative of a population characteristic breakdown voltage numbered from 1 through N for the respective lot numbered from 1 through N;

determining one or more anomalies based upon the processing of the minimum breakdown voltages, the one or more anomalies being associated with one or more processes associated with at least one of the lots; and providing an output based upon the one or more anomaly.

2. The method of claim 1 wherein the processing the plurality of minimum breakdown voltages comprises a Box-Cox transform.

3. The method of claim 1 wherein the processing the plurality of minimum breakdown voltages comprises a transform process.

4. The method of claim 1 wherein the plurality of breakdown voltages are associated with one or more interlayer dielectric materials for the respectively semiconductor devices.

5. The method of claim 1 wherein the one or more censored data skews an average value associated with the plurality of samples for at least one of the plurality of lots.

6. A method for monitoring device characteristics of semiconductor integrated circuits, the device characteristics including censored data and uncensored data, the method comprising:

determining a plurality of average breakdown voltages numbered from 1 through N, respectively, for a plurality of production lots numbered from 1 through N, where N, each of the plurality of production lots including a plurality of samples, the plurality of samples including one or more censored data points and one or more uncensored data points;

determining a plurality of minimum breakdown voltages numbered from 1 through N, respectively, for the plurality of lots numbered from 1 through N, each of the plurality of minimum breakdown voltages being indicative of the plurality of samples, including the one or more uncensored data points and the one or more censored data points;

processing the minimum breakdown voltages for each of the plurality of lots; and determining one or more anomalies based upon the processing of the minimum breakdown voltages; and providing an output based upon the one or more anomaly.

7. The method of claim 6 wherein the plotting comprises processing the plurality of minimum breakdown voltages using a Box-Cox transform.

8. The method of claim 6 wherein the plotting comprises processing the plurality of minimum breakdown voltages using a transform process.

9. The method of claim 6 wherein the plurality of breakdown voltages are associated with interlayer dielectric materials for the semiconductor devices.

10. The method of claim 6 wherein the plurality of lots correspond respectively to a group of wafers for the manufacture of integrated circuits.

11. The method of claim 6 wherein the wherein each of the plurality of samples comprises an integrated circuit device.

12. The method of claim 1 wherein the minimum breakdown voltages correspond to breakdown voltages associated with respective transistor devices.

13. The method of claim 6 wherein the one or more anomalies correspond to one or more outlier points.

14. The method of claim 6 wherein the output comprises a plot.

15. The method of claim 6 wherein the processing of the minimum breakdown voltages comprises comparing the minimum breakdown voltages against one or more control values.

16. The method of claim 6 wherein the determining of the minimum breakdown voltages comprises measuring breakdown voltage values from the respective plurality of samples.

* * * * *